US011458569B2

(12) United States Patent
Nakamura

(10) Patent No.: US 11,458,569 B2
(45) Date of Patent: Oct. 4, 2022

(54) WELDING DEVICE AND WELDING METHOD

(71) Applicant: TOYOTA JIDOSHA KABUSHIKI KAISHA, Toyota (JP)

(72) Inventor: Hideo Nakamura, Shizuoka (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 164 days.

(21) Appl. No.: 16/713,300

(22) Filed: Dec. 13, 2019

(65) Prior Publication Data

US 2020/0206843 A1 Jul. 2, 2020

(30) Foreign Application Priority Data

Dec. 26, 2018 (JP) .............................. JP2018-242912

(51) Int. Cl.
*B23K 26/21* (2014.01)
*B23K 26/12* (2014.01)
*B23K 26/03* (2006.01)
*B23K 26/082* (2014.01)
(Continued)

(52) U.S. Cl.
CPC ............ *B23K 26/21* (2015.10); *B23K 26/032* (2013.01); *B23K 26/082* (2015.10); *B23K 26/123* (2013.01); *B23K 26/142* (2015.10); *H01M 8/0202* (2013.01)

(58) Field of Classification Search
CPC .... B23K 26/21; B23K 26/082; B23K 26/032; B23K 26/123; B23K 26/142; H01M 8/0202; H01L 21/67098; H01L 21/324; H01L 21/67115; H01L 21/67248; H01L 21/68735; C23C 16/4411; C23C 16/4404;
(Continued)

(56) References Cited

U.S. PATENT DOCUMENTS 6,078,201 A * 6/2000 Crotty .................. H03K 17/223
327/143
7,345,258 B2 * 3/2008 Yasuda .............. B23K 26/0661
219/121.63
(Continued)

FOREIGN PATENT DOCUMENTS

CN 106956076 A 7/2017
JP 5853384 A 3/1983
(Continued)

*Primary Examiner* — Tu B Hoang
*Assistant Examiner* — Yeong Juen Thong
(74) *Attorney, Agent, or Firm* — Dickinson Wright, PLLC

(57) ABSTRACT

A welding device includes a laser irradiation unit that irradiates a workpiece with a laser light while scanning along an intended weld line of the workpiece, an upper jig arranged on a side of the laser irradiation unit with respect to the workpiece, and a lower jig arranged on an opposite side of the laser irradiation unit side. The upper jig includes an exposed portion that exposes the intended weld line of the workpiece to the laser irradiation unit side, an introduction path that is disposed in a downstream side in a scanning direction of the laser light and introduces an inert gas to the exposed portion, and a discharge path that is disposed in an upstream side in the scanning direction of the laser light and suctions the inert gas introduced to the exposed portion to discharge the inert gas to an outside.

4 Claims, 8 Drawing Sheets

(51) Int. Cl.
*B23K 26/142* (2014.01)
*H01M 8/0202* (2016.01)

(58) Field of Classification Search
CPC .......... C23C 16/45504; C23C 16/4558; C23C 16/45591; H23C 16/45582
USPC .......... 219/121.63, 121.64, 76.1, 75, 121.62, 219/121.61, 390, 408, 411, 444.1; 392/416, 418; 156/272.8; 118/504, 503, 118/715, 714, 724, 825, 728, 729, 730
See application file for complete search history.

(56) References Cited

U.S. PATENT DOCUMENTS

| | | | |
|---|---|---|---|
| 2010/0078413 A1* | 4/2010 | Hosokawa | B23K 26/147 219/121.64 |
| 2012/0070723 A1* | 3/2012 | Matsui | H01M 50/636 429/185 |
| 2012/0234804 A1* | 9/2012 | Ko | B23K 26/14 219/121.63 |
| 2016/0303688 A1* | 10/2016 | De Souza | B23K 26/21 |
| 2018/0029122 A1* | 2/2018 | Nakano | B22F 10/70 |

FOREIGN PATENT DOCUMENTS

| | | |
|---|---|---|
| JP | S5853384 A | 3/1983 |
| JP | 3143457 U | 7/2008 |
| JP | 2009064593 A | 3/2009 |
| JP | 2011161450 A | 8/2011 |
| WO | 2016001992 A1 | 1/2019 |

\* cited by examiner

Fig. 4
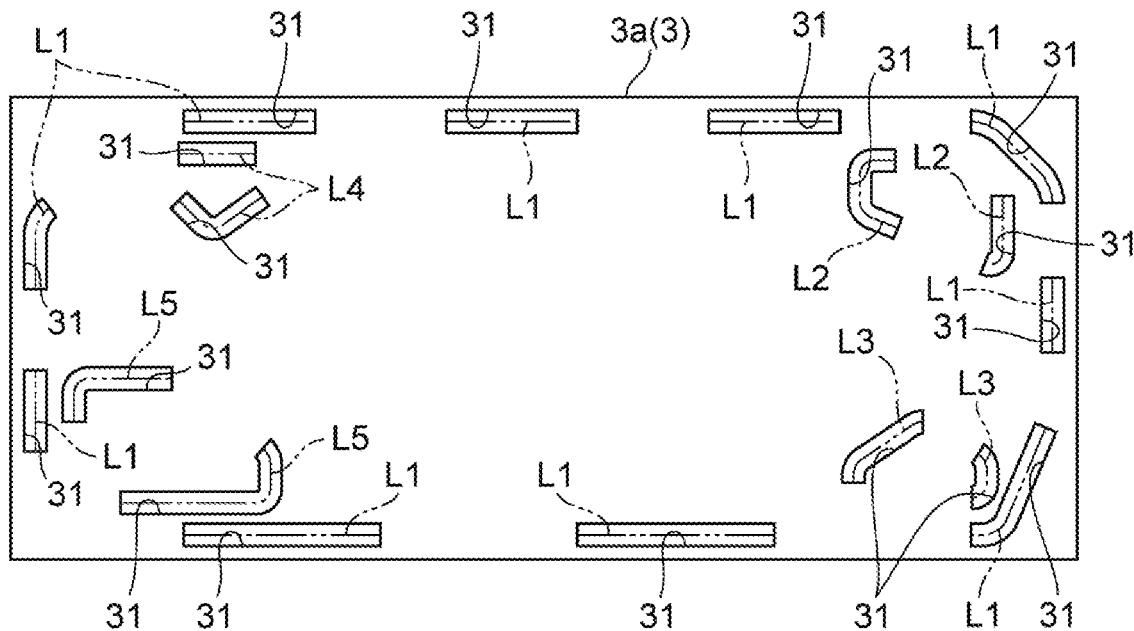
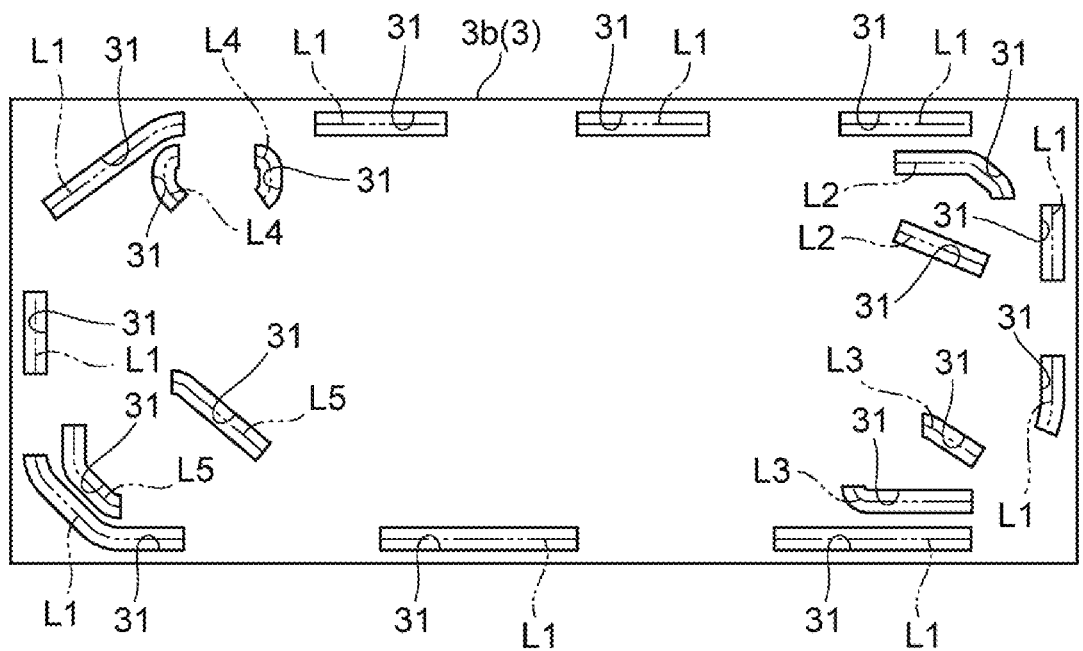

WELDING DEVICE AND WELDING METHOD

CROSS REFERENCE TO RELATED APPLICATIONS

The present application claims priority from Japanese patent application JP 2018-242912 filed on Dec. 26, 2018, the content of which is hereby incorporated by reference into this application.

BACKGROUND

Technical Field

The present disclosure relates to a welding device and a welding method, in particular, relates to a welding device and a welding method for welding fuel cell separators.

Background Art

Conventionally, as a welding device that welds fuel cell separators (hereinafter simply referred to as "separators"), there has been known a welding device described in, for example, WO 2016/001992. In the welding device described in WO 2016/001992, two sheet-shaped separators in a stacked state are sandwiched between an upper sandwiching member and a lower sandwiching member, and an outer peripheral edge sandwiching member and an inner peripheral edge sandwiching member that constitute the upper sandwiching member have a clearance irradiated with a laser light, and thus, these separators are welded. The upper sandwiching member and the lower sandwiching member have respective exhaust holes. Injecting an inert gas to a weld portion via the exhaust hole removes fumes and dust generated during welding and reduces welding failure and the like caused by metal fumes and the dust.

SUMMARY

However, since the above-described welding device is insufficient in removing the fumes and the dust generated during welding, the fumes and the dust accumulate in the weld portion and its peripheral area, and thus, there remains a problem of adversely affecting a quality of laser welding.

The present disclosure has been made to solve such a technical problem, and the present disclosure provides a welding device and a welding method that reduce an accumulation of fumes and dust generated during welding to ensure an improved quality of laser welding.

A welding device according to the present disclosure includes a laser irradiation unit, a first jig, and a second jig. The laser irradiation unit irradiates a workpiece with a laser light while scanning along an intended weld line of the workpiece with the laser light. The first jig is arranged on a side of the laser irradiation unit with respect to the workpiece. The second jig is arranged on an opposite side of the laser irradiation unit side with respect to the workpiece. The second jig is capable of sandwiching the workpiece with the first jig. The first jig includes an exposed portion, an introduction path, and a discharge path. The exposed portion exposes the intended weld line of the workpiece to the laser irradiation unit side. The introduction path is disposed in a downstream side in a scanning direction of the laser light. The introduction path introduces an inert gas to the exposed portion. The discharge path is disposed in an upstream side in the scanning direction of the laser light. The discharge path suctions the inert gas introduced to the exposed portion to discharge the inert gas to an outside.

With the welding device according to the present disclosure, introducing the inert gas to the exposed portion via the introduction path of the first jig, and discharging the inert gas introduced to the exposed portion to the outside via the discharge path ensure removing fumes and dust generated during welding by pushing and flowing them to the outside, thereby ensuring a reduced accumulation of the fumes and the dust. Moreover, since the introduction path is disposed in the downstream side in the scanning direction of the laser light and the discharge path is disposed in the upstream side in the scanning direction of the laser light, interference by the fumes and the dust to the laser light can be further reduced compared with a case where the introduction path is disposed in the upstream side in the scanning direction of the laser light and the discharge path is disposed in the downstream side in the scanning direction of the laser light. As a result, the accumulation of the fumes and the dust can be surely reduced, thereby ensuring an improved quality of laser welding.

The welding device according to the present disclosure may further include a chamber mounted on the first jig so as to cover the exposed portion. The chamber communicates with the exposed portion. The chamber may include a lid body that transmits the laser light and an introduction hole formed on a sidewall to introduce the inert gas to an inside of the chamber. Accordingly, when the inert gas is introduced to the inside of the chamber via the introduction hole, the introduced inert gas flows into the inside of the exposed portion communicating with the chamber to ensure pushing and flowing an oxygen gas inside the exposed portion to the outside. This ensures lowering an oxygen concentration inside the exposed portion and ensures reducing an oxidation of a weld portion formed by welding, thereby ensuring further improved quality of laser welding. Mounting the chamber thus covering the exposed portion ensures reducing a foreign matter inclusion and the like into the exposed portion.

In the welding device according to the present disclosure, the introduction path may incline obliquely downward at an angle $\theta$ with respect to a horizontal direction from the downstream side in the scanning direction of the laser light toward the upstream side, the discharge path may incline obliquely upward at the angle $\theta$ with respect to the horizontal direction from the downstream side in the scanning direction of the laser light toward the upstream side, and the angle $\theta$ may be $0° < \theta \leq 15°$. Accordingly, a flow of the inert gas introduced to the exposed portion via the introduction path becomes a laminar flow, thereby ensuring efficiently suctioning the fumes and the dust via the discharge path without causing the fumes and the dust to attach to walls of the exposed portion, so as to discharge the fumes and the dust.

In the welding device according to the present disclosure, the introduction path and the discharge path may be oppositely disposed. This suppresses, for example, the attachment of the fumes and the dust to the walls of the exposed portion, thereby ensuring a further enhanced effect of reducing the accumulation of the fumes and the dust.

A welding method according to the present disclosure is a welding method for welding a workpiece by sandwiching the workpiece between a first jig that has an exposed portion exposing an intended weld line of the workpiece and a second jig, and irradiating the workpiece with a laser light while scanning along the intended weld line of the workpiece exposed from the exposed portion with the laser light.

The welding method includes welding that includes irradiating the intended weld line of the workpiece with the laser light while introducing an inert gas to the exposed portion from a downstream side in a scanning direction of the laser light and suctioning the inert gas introduced to the exposed portion from an upstream side in the scanning direction of the laser light to discharge the inert gas to an outside.

In the welding method according to the present disclosure, since the inert gas is introduced to the exposed portion from the downstream side in the scanning direction of the laser light, and while suctioning the inert gas introduced to the exposed portion from the upstream side in the scanning direction of the laser light to discharge the inert gas to the outside, the intended weld line of the workpiece is irradiated with the laser light, the fumes and the dust generated during welding can be removed by pushing and flowing them to the outside, thereby ensuring the reduced accumulation of the fumes and the dust. Moreover, since the inert gas is introduced from the opposite direction with respect to the scanning direction of the laser light (that is, direction from downstream side toward upstream side) to push and flow the fumes and the dust, interference by the fumes and the dust to the laser light can be further reduced compared with a case where, for example, the inert gas is introduced along the scanning direction of the laser light (that is, direction from upstream side toward downstream side). As a result, the accumulation of the fumes and the dust can be reduced, thereby ensuring the improved quality of laser welding.

The welding method according to the present disclosure may further include preparing that includes sandwiching the workpiece by relatively bringing the second jig on which the workpiece is placed close to the first jig before the welding. The preparing may include introducing the inert gas to the exposed portion from the downstream side in the scanning direction of the laser light while relatively bringing the second jig close to the first jig and introducing the inert gas to an inside of a chamber that is mounted on the first jig and communicates with the exposed portion. Accordingly, when the inert gas is introduced to the inside of the chamber, the introduced inert gas flows into the inside of the exposed portion communicating with the chamber, thereby ensuring pushing and flowing the oxygen gas inside the exposed portion to the outside. Since this ensures lowering the oxygen concentration inside the exposed portion, the oxidation of the weld portion formed by welding can be reduced, thereby ensuring improved quality of laser welding. Since such a pushing and flowing operation of the oxygen gas can be performed simultaneously with the sandwiching operation of the workpiece, there is no cycle time lost in association with the pushing and flowing of the oxygen gas, thereby ensuring immediately executing the welding after sandwiching the workpiece between the first jig and the second jig. As a result, the efficiency of the welding operation can be enhanced, thereby easily achieving improved productivity.

In the welding method according to the present disclosure, the preparing may include suctioning the inert gas inside the exposed portion from the upstream side in the scanning direction of the laser light to discharge the inert gas to the outside after the workpiece is sandwiched between the first jig and the second jig. Accordingly, even if the oxygen gas remains inside the exposed portion, the remaining oxygen gas can be discharged, thereby ensuring the further enhanced effect of lowering the oxygen concentration. As a result, the improved quality of laser welding is ensured.

The present disclosure reduces the accumulation of fumes and dust generated during welding to ensure the improved quality of laser welding.

BRIEF DESCRIPTION OF THE DRAWINGS

FIG. 4 is a plan view illustrating a first upper jig and a second upper jig:

DETAILED DESCRIPTION

Figure 1:
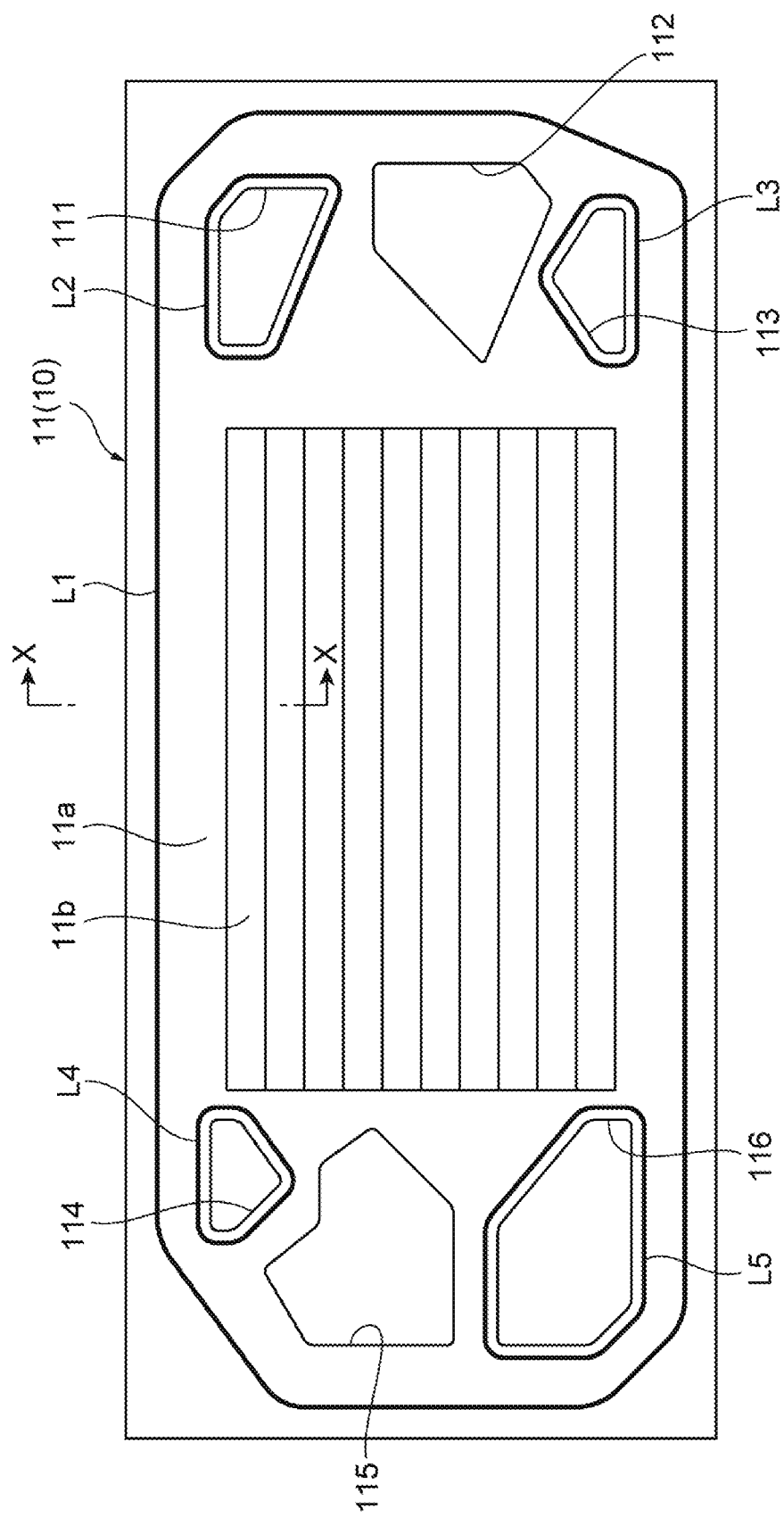
FIG. 1 is a plan view illustrating a workpiece.
Figure 2:
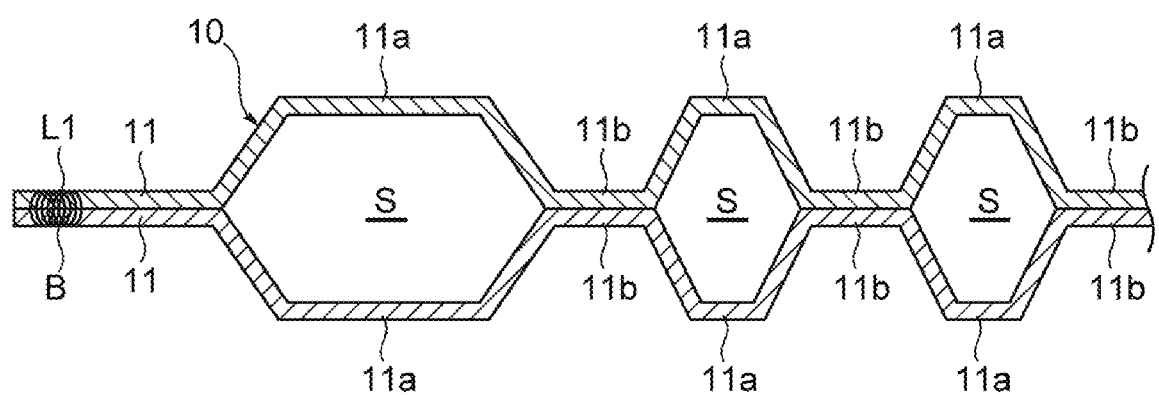
FIG. 2 is a cross-sectional view taken along the line X-X in FIG. 1.

While the following describes an embodiment of a welding device and a welding method according to the present disclosure with reference to the drawings, before that, a structure of a workpiece to be welded is briefly described based on FIG. 1 and FIG. 2.

Workpiece

FIG. 1 is a plan view illustrating a workpiece. FIG. 2 is a cross-sectional view taken along the line X-X in FIG. 1. As illustrated in FIG. 1 and FIG. 2, a workpiece 10 according to this embodiment is two stacked separators 11 used for, for example, a fuel cell. The separator 11 is formed by press forming a metal plate material, such as stainless steel and titanium steel, such that protruding portions 11a and recessed portions 11b are alternately repeated. The two separators 11 are stacked such that the recessed portions 11b of one separator 11 are brought into contact with the recessed portions 11b of the other separator 11. This forms spaces S between the protruding portions 11a of one separator 11 and the protruding portions 11a of the other separator 11. This space S serves as a refrigerant flow channel for distributing a refrigerant to cool the fuel cell.

As illustrated in FIG. 1, the separator 11 has one end portion (right-side end portion in FIG. 1) in its longitudinal direction (that is, direction perpendicular to direction in which the protruding portions 11a and the recessed portions 11b are repeated) where a fuel gas inlet manifold 111, a refrigerant outlet manifold 112, and an oxidant gas outlet manifold 113 are disposed in this order. The separator 11 has the other end portion (left-side end portion in FIG. 1) in its longitudinal direction where an oxidant gas inlet manifold 114, a refrigerant inlet manifold 115, and a fuel gas outlet manifold 116 are disposed in this order.

The two stacked separators 11 are secured to one another by being welded on intended weld lines L1 to L5 illustrated in FIG. 1. More specifically, the intended outer periphery weld line L1 is in a loop shape along a peripheral edge portion of the separator 11 so as to surround a portion where the protruding portions 11a and the recessed portions 11b are formed, the fuel gas inlet manifold 111, the refrigerant outlet manifold 112, the oxidant gas outlet manifold 113, the oxidant gas inlet manifold 114, the refrigerant inlet manifold 115, and the fuel gas outlet manifold 116. The intended fuel gas inlet weld line L2 is formed into a loop shape so as to surround the fuel gas inlet manifold 111, and the intended oxidant gas outlet weld line L3 is formed into a loop shape so as to surround the oxidant gas outlet manifold 113.

The intended oxidant gas inlet weld line L4 is formed into a loop shape so as to surround the oxidant gas inlet manifold 114, and the intended fuel gas outlet weld line L5 is formed into a loop shape so as to surround the fuel gas outlet manifold 116. On these intended weld lines L1 to L5, weld portions (weld beads) B are formed by welding.

Welding Device

Figure 3:
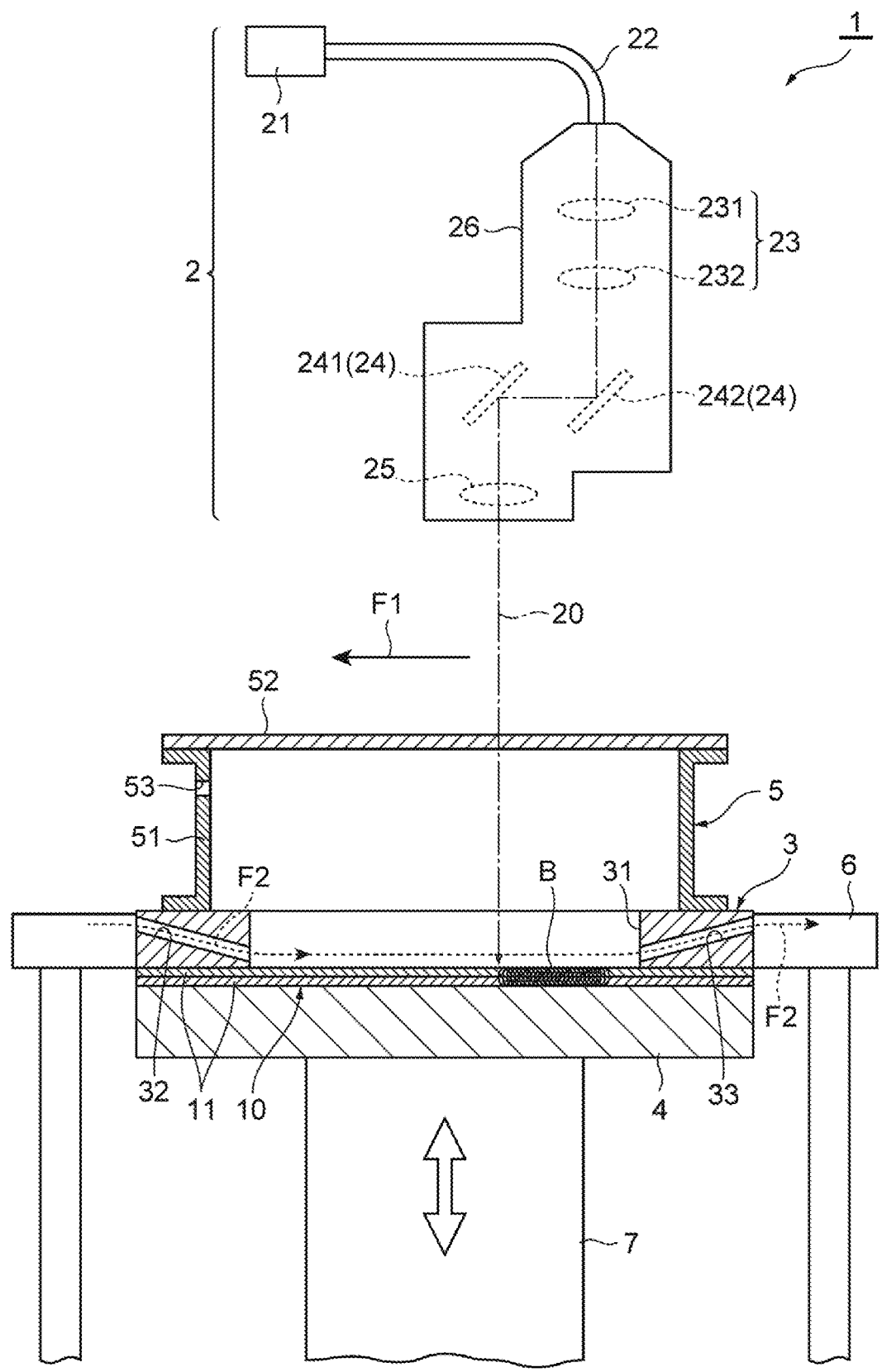
FIG. 3 is a schematic diagram illustrating a welding device according to an embodiment.

The following describes a welding device of this embodiment with reference to FIG. 3 to FIG. 6. FIG. 3 is a schematic diagram illustrating the welding device according to the embodiment. A welding device 1 of this embodiment includes a laser irradiation unit 2 that irradiates the workpiece 10 with a laser light to weld the workpiece 10, an upper jig (first jig) 3 and a lower jig (second jig) 4 that sandwich the workpiece 10 from both upper and lower sides to secure the workpiece 10, and a chamber 5 arranged on an upper side of the upper jig 3.

The laser irradiation unit 2 at least includes a laser oscillator 21 that emits a laser light 20, a lens unit 23 optically connected to the laser oscillator 21 via an optical fiber 22, and a galvano scanner 24 that scans the laser light 20. The lens unit 23 includes, for example, a collimator lens 231 and a condenser lens 232.

The galvano scanner 24 is a device for scanning the laser light 20 at high speed and at an accurate position, and includes a pair of galvanometer mirrors 241 and 242. The galvanometer mirror 241 and the galvanometer mirror 242 are supported by rotation shafts of respective motors (not illustrated). By adjusting respective reflection angles at high speed by driving of the motors ensures scanning the laser light 20 along the intended weld lines L1 to L5 at high speed.

The galvano scanner 24 has an output side where an Fθ lens 25 is arranged. The Fθ lens 25 is a lens to correct a scanrate of the laser light 20 to be constant. The lens unit 23, the galvano scanner 24, and the Fθ lens 25 are housed inside a housing 26.

The upper jig 3 is arranged on a side of the laser irradiation unit 2 with respect to the workpiece 10 (in this embodiment, upper side of the workpiece 10), and is secured to a welding workbench 6, for example, by screwing in a state of being fitted in an opening of the welding workbench 6. The upper jig 3 presents a rectangular plate shape, and has a plurality of exposed portions 31 that expose the intended weld lines L1 to L5 of the workpiece 10 to the laser irradiation unit 2 side. The exposed portions 31 are formed at positions, corresponding to the intended weld lines L1 to L5 of the workpiece 10, in the upper jig 3, and are formed of through grooves extending along the corresponding intended weld lines L1 to L5. While in this embodiment, the exposed portions 31 are formed to have constant widths (that is, equal width) toward the upper side, which is the laser irradiation unit 2 side, the exposed portions 31 may be formed into taper shapes (that is, widening width) that increase widths toward the upper side.

Such an upper jig 3, for example as illustrated in FIG. 4, includes a first upper jig 3a and a second upper jig 3b. FIG. 4 is a plan view that illustrates the first upper jig and the second upper jig. In FIG. 4, the intended weld lines L1 to L5 of the workpiece 10 are indicated by two-dot chain lines in order to make correspondence relationships between the respective exposed portions 31 and the intended weld lines L1 to L5 easier to see. The first upper jig 3a and the second upper jig 3b are each formed into a rectangular shape, but are different in positions of the exposed portions 31 that expose the intended weld lines L1 to L5. More specifically, the exposed portions 31 that expose the intended weld lines L1 to L5 are not formed into loop shapes similarly to the respective corresponding intended weld lines L1 to L5, but the respective exposed portions 31 form exposed portions that expose a part of the loop-shaped intended weld lines L1 to L5 to the first upper jig 3a and exposed portions that expose the remaining portions of the loop-shaped intended weld lines L1 to L5 to the second upper jig 3b.

As illustrated in FIG. 3, the upper jig 3 has an introduction path 32 that introduces an inert gas to the exposed portions 31, and a discharge path 33 that suctions the inert gas introduced to the exposed portions 31 to discharge the inert gas to an outside. The introduction path 32 is arranged in a downstream side (left side in FIG. 3) in a scanning direction F1 of the laser light 20 with respect to the exposed portions 31, and is formed of an elongate hole provided inside the upper jig 3. This introduction path 32 has one end that communicates with a supply passage (not illustrated) that supplies the inert gas, and the other end that communicates with the exposed portions 31. The inert gas here is a gas chemically stable with respect to the weld portions B formed by welding, and, for example, an argon gas, a nitrogen gas, a helium gas, a carbon dioxide gas, and a mixed gas of these gases can be included.

The discharge path 33 is arranged in an upstream side in the scanning direction F1 of the laser light 20 with respect to the exposed portions 31, and is formed of an elongate hole provided inside the upper jig 3. The discharge path 33 has one end that communicates with the exposed portions 31, and the other end that communicates with an outside (for example, atmosphere). In some embodiments, the introduction path 32 and the discharge path 33 are arranged oppositely one another, and are formed to be in positions at an approximately same height.

Figure 5:
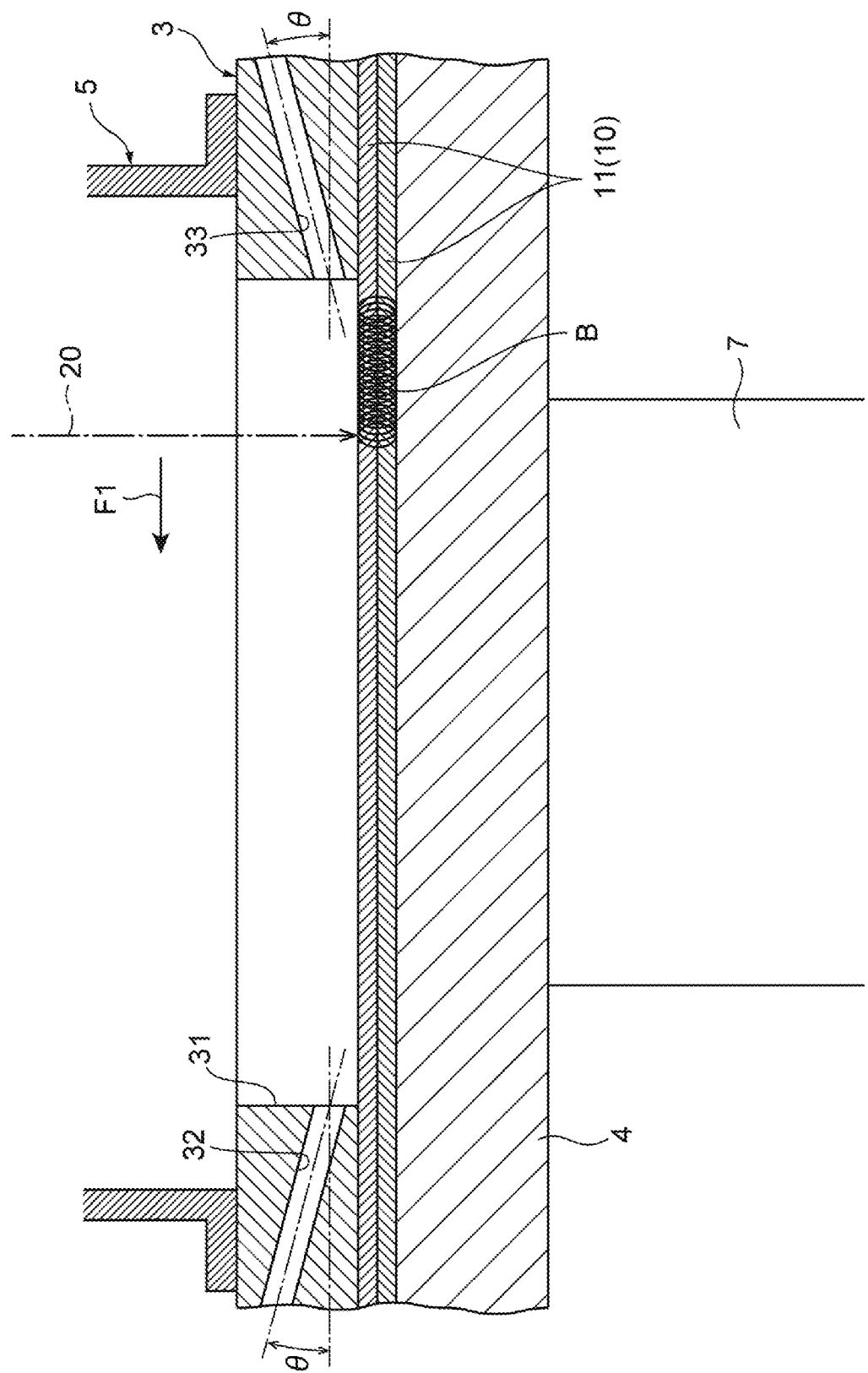
FIG. 5 is an enlarged view illustrating an introduction path and a discharge path of an upper jig.

FIG. 5 is an enlarged view illustrating the introduction path and the discharge path of the upper jig. As illustrated in FIG. 5, the introduction path 32 inclines obliquely downward at an angle θ with respect to the horizontal direction from the downstream side in the scanning direction F1 of the laser light 20 toward the upstream side. Meanwhile, the discharge path 33 inclines obliquely upward at the angle θ with respect to the horizontal direction from the downstream side in the scanning direction F1 of the laser light 20 toward the upstream side. The angle θ here means an angle formed by a center axis of the introduction path 32 or the discharge path 33 and the horizontal direction, and in some embodiments, it is $0° < θ ≤ 15°$.

Figure 6:
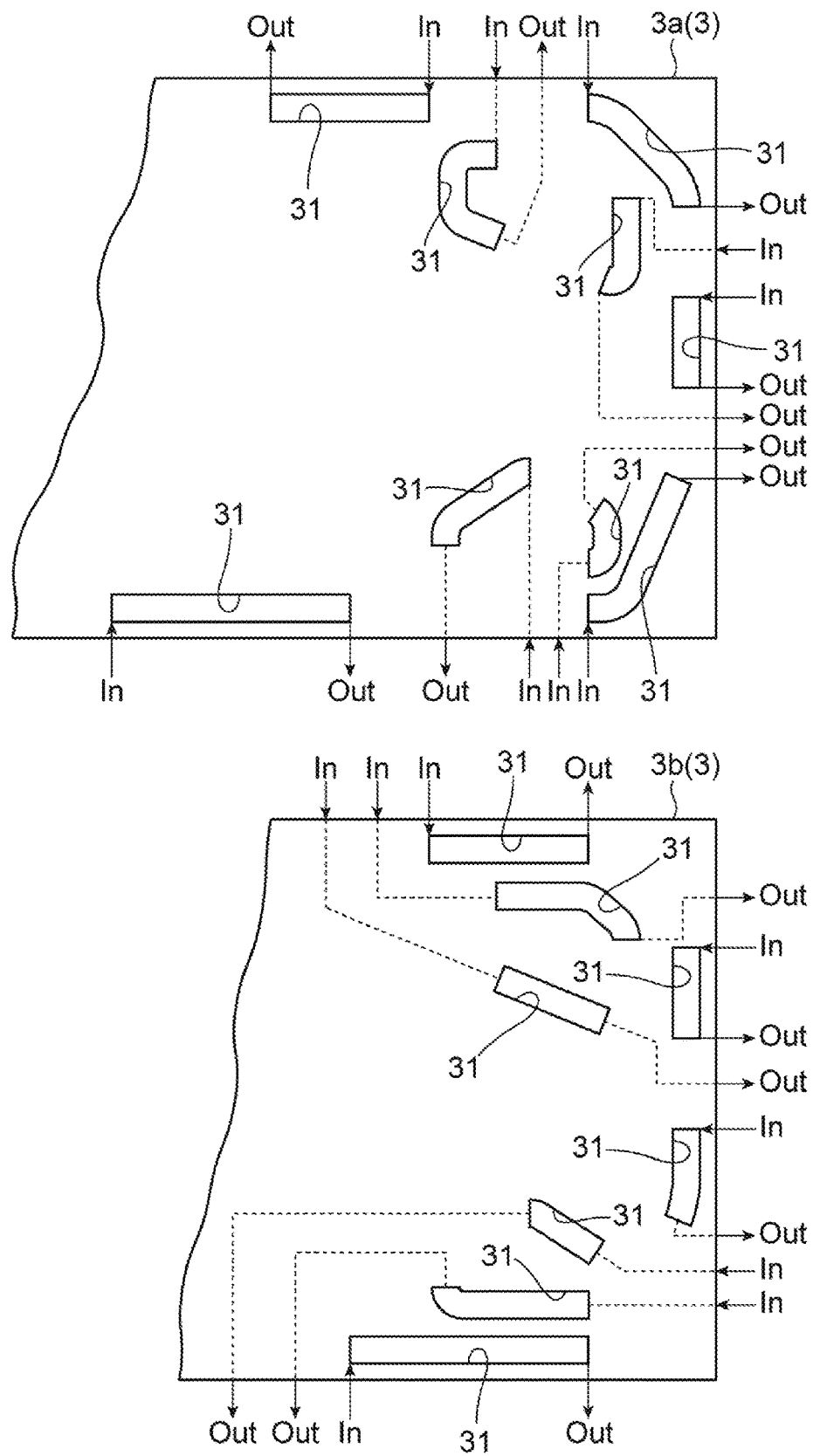
FIG. 6 is a partial schematic diagram illustrating an introduction and a discharge of an inert gas in the first upper jig and the second upper jig.

The introduction path 32 and the discharge path 33 of such an inert gas are disposed for each of the exposed portions 31 that expose the intended weld lines L1 to L5 in the upper jig 3. For example, as illustrated in FIG. 6, on the first upper jig 3a and the second upper jig 3b, an introduction path (see "In" in FIG. 6) and a discharge path (see "Out" in FIG. 6) are each formed for each of the exposed portions 31. The introduction path is positioned in the downstream side in the scanning direction of the laser light to introduce the inert gas to the exposed portion 31. The discharge path is positioned in the upstream side in the scanning direction of the laser light to suction the inert gas introduced to the exposed portion 31 to discharge the inert gas to the outside.

Meanwhile, the lower jig 4 is arranged in an opposite side (lower side of the workpiece 10 in this embodiment) of the laser irradiation unit side with respect to the workpiece 10, and is constituted to be able to sandwich the workpiece 10 with the upper jig 3. Specifically, the lower jig 4 is formed into a rectangular plate shape, is arranged at a position opposite to the upper jig 3 secured to the welding workbench 6, and is constituted such that the lower jig 4 is brought close and move away with respect to the upper jig 3 by an elevating device 7.

The chamber 5 is arranged in an upper side of the upper jig 3 so as to cover the exposed portions 31 and communicates with the exposed portions 31. This chamber 5 includes a hollow tubular body 51 and a lid body 52 that transmits the laser light 20. The hollow tubular body 51 is formed of, for example, a resin material, and is mounted on the upper jig 3 by, for example, screwing. The lid body 52 is formed of, for example, a transparent glass plate, and is secured to the hollow tubular body 51 by, for example, screwing. The hollow tubular body 51 has a sidewall where an introduction hole 53 that introduces the inert gas to an inside of the chamber 5 is formed. The introduction hole 53 is arranged in the downstream side in the scanning direction F1 of the laser light 20 and at a position close to the lid body 52 on the sidewall of the hollow tubular body 51.

In the welding device 1 constituted as described above, the upper jig 3 includes the exposed portions 31 that expose the intended weld lines L1 to L5 of the workpiece 10 to the laser irradiation unit 2 side, the introduction path 32 that is disposed in the downstream side in the scanning direction F1 of the laser light 20 and introduces the inert gas to the exposed portion 31, and the discharge path 33 that is disposed in the upstream side in the scanning direction F1 of the laser light 20 and suctions the inert gas introduced to the exposed portion 31 to discharge the inert gas to the outside. Thus, the inert gas can be introduced to the exposed portion 31 via the introduction path 32, and further, the inert gas introduced to the exposed portion 31 can be suctioned to be discharged to the outside as indicated by an arrow F2 in FIG. 3. This ensures removing fumes and dust generated during welding by pushing and flowing the fumes and the dust to the outside, thereby ensuring reduced accumulation of the fumes and the dust in the exposed portion 31.

Moreover, the introduction path 32 is disposed in the downstream side in the scanning direction F1 of the laser light 20, and the discharge path 33 is disposed in the upstream side. Thus, the inert gas can be introduced to the exposed portion 31 from the opposite direction in the scanning direction F1 of the laser light 20, and the fumes and the dust generated during welding can be pushed and flown. This ensures further reduced interference by the fumes and the dust to the laser light compared with a case where, for example, the introduction path is disposed in the upstream side in the scanning direction F1 of the laser light 20 and the discharge path is disposed in the downstream side in the scanning direction of the laser light. As a result, the accumulation of the fumes and the dust can be surely reduced, thereby ensuring an improved quality of laser welding.

The introduction path 32 inclines obliquely downward at the angle θ with respect to the horizontal direction from the downstream side in the scanning direction F1 of the laser light 20 toward the upstream side, the discharge path 33 inclines obliquely upward at the angle θ with respect to the horizontal direction from the downstream side in the scanning direction F1 of the laser light 20 toward the upstream side, and the angle θ is 0°<θ≤15°. This causes the flow of the inert gas introduced to the exposed portion 31 via the introduction path 32 to become a laminar flow, thereby ensuring efficiently suctioning the fumes and the dust to discharge the fumes and the dust to the outside via the discharge path 33 without allowing the fumes and the dust to attach to walls of the exposed portion 31.

Furthermore, the introduction path 32 and the discharge path 33 are arranged oppositely one another. Thus, for example, the attachment of the fumes and the dust to the walls of the exposed portion 31 is suppressed, thereby ensuring a further enhanced effect of reducing the accumulation of the fumes and the dust.

Furthermore, the chamber 5 that communicates with the exposed portions 31 is mounted on the upper side of the exposed portions 31. Thus, a foreign matter inclusion and the like into the exposed portions 31 can be reduced. The introduction hole 53 that introduces the inert gas to the inside of the chamber 5 is formed on the sidewall of the hollow tubular body 51 in the chamber 5. Thus, for example, when the inert gas is introduced to the inside of the chamber 5 via the introduction hole 53, the introduced inert gas flows into the exposed portions 31 that communicate with the chamber 5, thereby ensuring pushing and flowing the oxygen gas inside the exposed portions 31 to the outside. As a result, an oxygen concentration inside the exposed portions 31 can be lowered and the oxidation of the weld portion formed by welding can be reduced, thereby ensuring the improved quality of laser welding.

Welding Method

Figure 7:
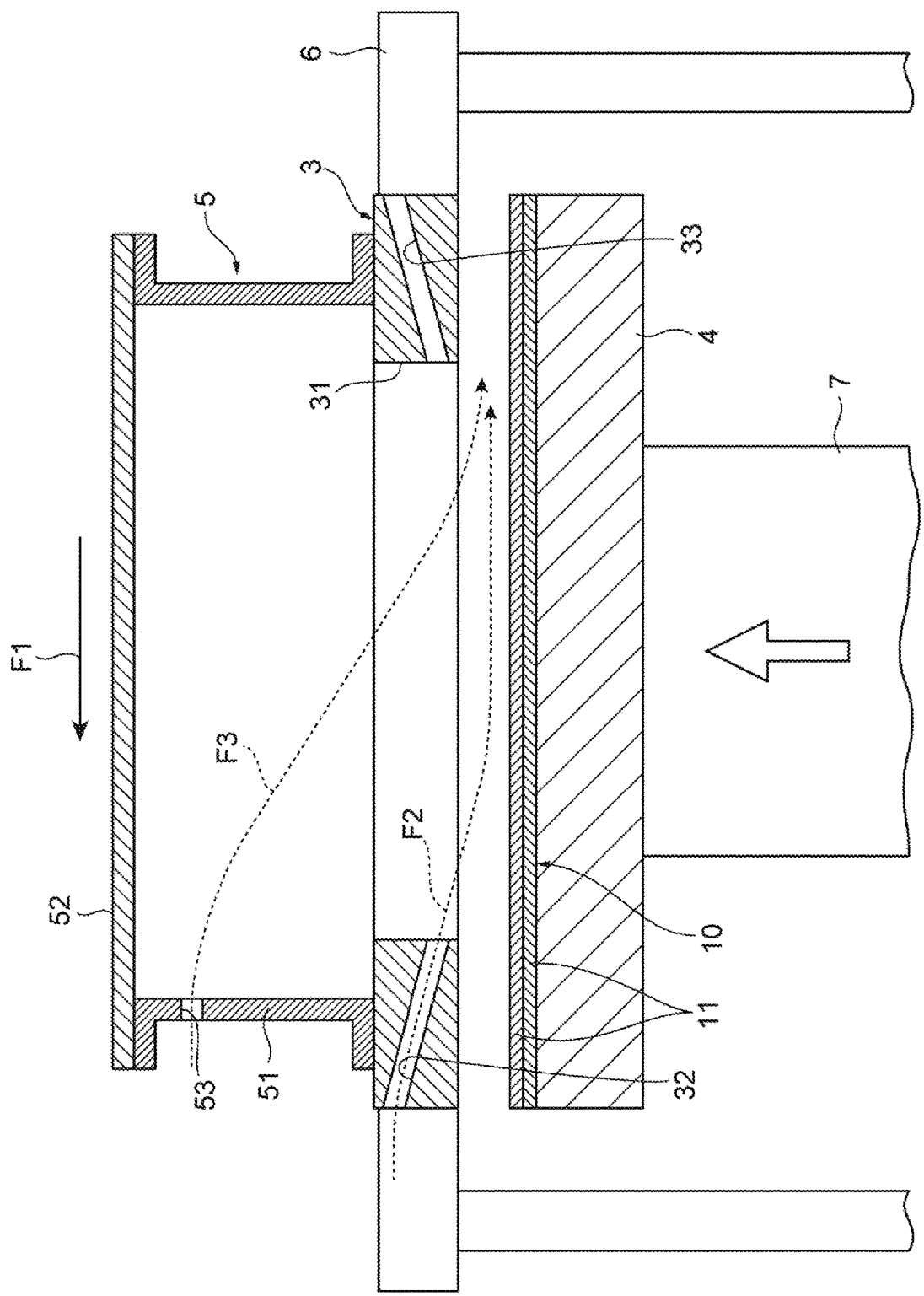
FIG. 7 is a schematic diagram for describing a welding method according to the embodiment.
Figure 8:
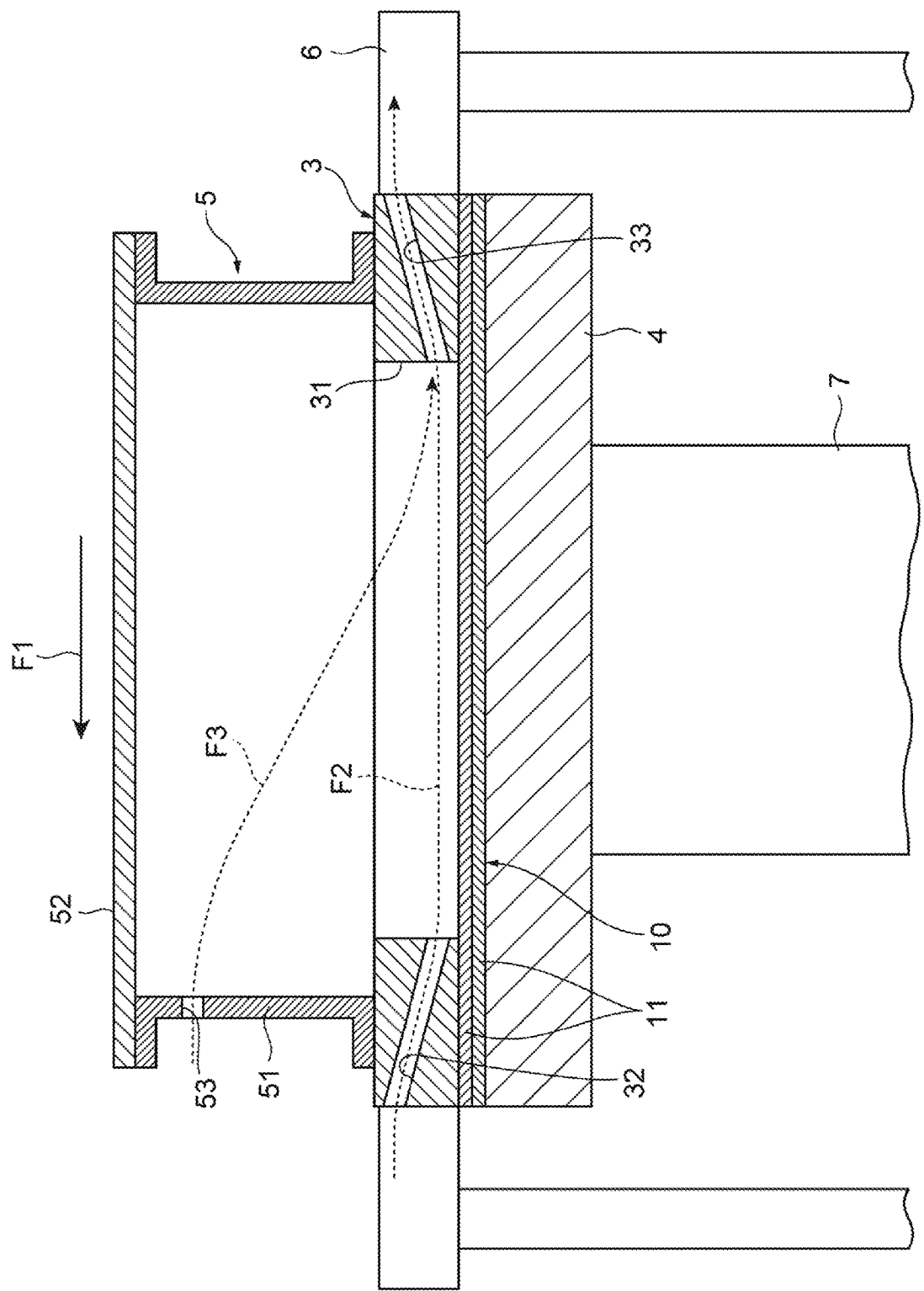
FIG. 8 is a schematic diagram for describing the welding method according to the embodiment.

The following describes a welding method according to this embodiment with reference to FIG. 7 and FIG. 8. In FIG. 7 and FIG. 8, the laser irradiation unit 2 is omitted. The welding method in this embodiment at least includes a preparation step and a welding step.

In the preparation step, first, the upper jig 3 is secured to the welding workbench 6, the chamber 5 is installed on the upper side of the upper jig 3 so as to cover the exposed portions 31 of the upper jig 3, and the chamber 5 is mounted on and secured to the upper jig 3 by, for example, screwing. Subsequently, two separators 11 are placed in sequence on an upper surface of the lower jig 4 to position the two separators 11, thus preparing the workpiece 10. Here, the preparation operation of the workpiece 10 may be performed prior to the securing operation of the upper jig 3.

Next, while relatively bringing the lower jig 4 close to the upper jig 3 and introducing the inert gas to the inside of the chamber 5 that is mounted on the upper jig 3 and communicates with the exposed portions 31, the inert gas is introduced to the exposed portions 31 from the downstream side in the scanning direction F1 of the laser light 20. Specifically, as illustrated in FIG. 7, elevating the lower jig 4 by the elevating device 7 brings the lower jig 4 close to the upper jig 3. Simultaneously with this, while introducing the inert gas to the inside of the chamber 5 via the introduction hole 53 of the chamber 5, the inert gas is introduced to the exposed portions 31 via the introduction path 32 of the upper jig 3.

When the inert gas is introduced to each of the inside of the chamber 5 via the introduction hole 53 of the chamber 5 and the exposed portions 31 via the introduction paths 32 of the upper jig 3, the suction of the inert gas via the discharge paths 33 is not performed. Specifically, covering the discharge path 33 using, for example, a blocking member blocks the inert gas from flowing outside via the discharge path 33.

With this, the inert gas introduced to the inside of the exposed portion 31 via the introduction path 32 of the upper jig 3 does not flow to the discharge path 33 as indicated by the arrow F2 in FIG. 7, but flows outside passing through a clearance between the upper jig 3 and the workpiece 10 placed on the lower jig 4. Meanwhile, the inert gas introduced to the inside of the chamber 5 via the introduction hole 53 flows into the exposed portions 31 of the upper jig 3 communicating with the chamber 5 as indicated by an arrow F3 in FIG. 7, and furthermore, flows outside passing through the clearance between the upper jig 3 and the workpiece 10 placed on the lower jig 4. Such a flow of the inert gas causes the oxygen gas inside the chamber 5 and the exposed portions 31 to be pushed and flown to the outside by the inert gas.

When the workpiece 10 placed on the lower jig 4 is brought into contact with a bottom surface of the upper jig 3, and is pressurized by the upper jig 3 and the lower jig 4 at a predetermined value, the elevation of the elevating device 7 stops. This sandwiches the workpiece 10 between the upper jig 3 and the lower jig 4.

In the preparation step, after sandwiching the workpiece 10 between the upper jig 3 and the lower jig 4, furthermore, the inert gas inside the exposed portions 31 is suctioned from the upstream side in the scanning direction F1 of the laser light 20 to be discharged to the outside.

That is, as illustrated in FIG. 8, when the workpiece 10 is sandwiched by the upper jig 3 and the lower jig 4, the suctioning operation via the discharge path 33 is performed. This discharges the inert gas introduced to the inside of the exposed portions 31 via the introduction path 32 of the upper jig 3 to the outside via the discharge path 33 as indicated by the arrow F2 in FIG. 8. Meanwhile, the inert gas introduced to the inside of the chamber 5 via the introduction hole 53 flows into the exposed portions 31 of the upper jig 3 communicating with the chamber 5 as indicated by the arrow F3 in FIG. 8, and furthermore, is discharged to the outside via the discharge path 33.

In the welding step continuous with the preparation step, the inert gas is introduced to the exposed portions 31 of the upper jig 3 from the downstream side in the scanning direction F1 of the laser light 20, and while suctioning the inert gas introduced to the exposed portions 31 from the upstream side in the scanning direction F1 of the laser light 20 to discharge the inert gas to the outside, the intended weld lines L1 to L5 of the workpiece 10 is irradiated with the laser light 20. That is, as illustrated in FIG. 3, while introducing the inert gas to the inside of the exposed portion 31 via the introduction path 32 and discharging the introduced inert gas to the outside via the discharge path 33, the workpiece 10 is scanned to be irradiated with the laser light 20 along the intended weld lines L1 to L5 of the workpiece 10 exposed from the exposed portions 31 of the upper jig 3, thereby welding the workpiece 10. This forms the weld portions (weld beads) B on the workpiece 10, and thus, the separators 11 that constitute the workpiece 10 are secured to one another.

In this welding step, the introducing operation of the inert gas into the chamber 5 performed in the preparation step may be executed or may be stopped. When the introducing operation of the inert gas into the chamber 5 via the introduction hole 53 is executed, the effect (details will be described below) that lowers the oxygen concentration inside the exposed portions 31 can be further enhanced. Furthermore, in some embodiments, the introducing operation of the inert gas into the chamber 5 via the introduction hole 53 is executed until the lower jig 4 descends after the termination of the welding step. Accordingly, the oxygen concentration in the peripheral area of the weld portion can be maintained to a determined standard value, thereby ensuring suppressing the oxidation of the weld portion immediately after welding.

The above-described welding operation is performed along all the intended weld lines L1 to L5. As described above, when the upper jig 3 has two jigs (the first upper jig 3a and the second upper jig 3b), the welding operation is divided into a first welding operation that uses the first upper jig 3a and a second welding operation that uses the second upper jig 3b. In this case, for example, after the first welding operation is terminated, the lower jig 4 is once caused to descend, and a replacement of the upper jig 3 (that is, replacing to the second upper jig 3b from the first upper jig 3a) is performed. Then, it is only necessary to repeatedly execute the above-described preparation step and the welding step.

According to the welding method according to this embodiment, in the preparation step, while relatively bringing the lower jig 4 on which the workpiece 10 is placed close to the upper jig 3, the inert gas is introduced to the inside of the chamber 5 via the introduction hole 53 and the inert gas is introduced into the exposed portion 31 from the downstream side in the scanning direction F1 of the laser light 20 via the introduction path 32. When the inert gas is introduced to the inside of the chamber 5, the introduced inert gas flows into the inside of the exposed portions 31 communicating with the chamber 5, thus ensuring pushing and flowing the oxygen gas inside the exposed portions 31 to the outside. This ensures lowering the oxygen concentration inside the exposed portions 31, thereby ensuring a reduced oxidation of weld portion B formed by welding and ensuring the improved quality of laser welding.

Also, the pushing and flowing operation of the oxygen gas can be thus performed simultaneously with the sandwiching operation of the workpiece 10, therefore, there is no cycle time lost in association with the pushing and flowing of the oxygen gas, thereby ensuring immediately executing the welding step after sandwiching the workpiece 10 between the upper jig 3 and the lower jig 4. As a result, the efficiency of the welding operation can be enhanced, thereby easily achieving improved productivity.

Furthermore, in the preparation step, after sandwiching the workpiece 10 between the upper jig 3 and the lower jig 4, an operation that suctions the inert gas inside the exposed portions 31 from the upstream side in the scanning direction F1 of the laser light 20 to discharge the inert gas to the outside is further performed. Accordingly, if the oxygen gas remains inside the exposed portions 31 or if the oxygen gas remains inside the discharge paths 33, the remaining oxygen gas is pushed and flown to the outside by the inert gas. Therefore, the effect of lowering the oxygen concentration can be further enhanced.

Also, in the welding step, the inert gas is introduced to the exposed portion 31 from the introduction path 32 disposed in the downstream side in the scanning direction F1 of the laser light 20, and while suctioning the inert gas introduced to the exposed portion 31 from the discharge path 33 disposed in the upstream side in the scanning direction of the laser light 20 to discharge the inert gas to the outside, the intended weld lines L1 to L5 of the workpiece are irradiated with the laser light 20, thereby pushing and flowing the fumes and the dust generated during welding to ensure removing them. Therefore, the accumulation of the fumes and the dust can be reduced.

Moreover, since the fumes and the dust are pushed and flown by introducing the inert gas from the opposite direction with respect to the scanning direction F1 of the laser light 20, interference by the fumes and the dust to the laser light can be further reduced compared with a case where, for example, the inert gas is introduced along the scanning direction of the laser light. As a result, the accumulation of the fumes and the dust can be surely reduced, thereby ensuring the improved quality of laser welding.

While the embodiment of the present disclosure has been described in detail above, the present disclosure is not limited thereto, and can be subjected to various kinds of changes in design without departing from the spirit and scope of the present disclosure described in the claims. For example, while in the above-described embodiment, the description has been made with an example of the separator as the workpiece, the present disclosure is applied to welding of a workpiece other than the separator. While in the above-described embodiment, the description has been made of the welding of two separators in a stacked state, that is, stack welding, the present disclosure is also applied to butt welding, fillet welding, and the like.

Furthermore, while in the above-described embodiment, the description has been made with an example where the first jig is arranged on the upper side of the workpiece, and the second jig is arranged on the lower side of the workpiece, the first jig and the second jig are not limited to be arranged on both the upper and lower sides of the workpiece, but, for example, they may be arranged on both right and left sides with respect to the workpiece. As a method for relatively bringing the lower jig on which the workpiece is placed close to the upper jig, the upper jig may be caused to descend, besides the elevation of the lower jig by the above-described elevating device.

DESCRIPTION OF SYMBOLS

1 Welding device
2 Laser irradiation unit
3 Upper jig
4 Lower jig
5 Chamber
6 Welding workbench
7 Elevating device
20 Laser light
21 Laser oscillator
22 Optical fiber
23 Lens unit
24 Galvano scanner
25 Fθ lens
31 Exposed portion
32 Introduction path
33 Discharge path
51 Hollow tubular body
52 Lid body
53 Introduction hole
231 Collimator lens
232 Condenser lens
241, 242 Galvanometer mirror
F1 Scanning direction

What is claimed is:

1. A welding device comprising:
   a laser irradiation unit that irradiates a workpiece with a laser light while scanning in a scanning direction along an intended weld line of the workpiece with the laser light;
   a first jig arranged on a side of the laser irradiation unit with respect to the workpiece; and
   a second jig arranged on an opposite side of the laser irradiation unit side with respect to the workpiece, the second jig being capable of sandwiching the workpiece with the first jig,
   wherein the first jig includes:
      a plurality of exposed portions that expose the intended weld line of the workpiece to the laser irradiation unit side;
      a plurality of introduction paths disposed in a downstream side in the scanning direction of the laser light, the introduction paths introducing an inert gas to the exposed portion; and
      a plurality of discharge paths disposed in an upstream side in the scanning direction of the laser light, the discharge paths suctioning the inert gas introduced to the exposed portion to discharge the inert gas to an outside;
   wherein one of the plurality of introduction paths and the discharge paths are formed for each of the plurality of exposed portions.

2. The welding device according to claim 1, further comprising
   a chamber mounted on the first jig so as to cover the exposed portion, the chamber communicating with the exposed portion,
   wherein the chamber includes a lid body that transmits the laser light and an introduction hole formed on a sidewall to introduce the inert gas to an inside of the chamber.

3. The welding device according to claim 1,
   wherein the introduction path inclines obliquely downward at an angle θ with respect to a horizontal direction from the downstream side in the scanning direction of the laser light toward the upstream side,
   wherein the discharge path inclines obliquely upward at the angle θ with respect to the horizontal direction from the downstream side in the scanning direction of the laser light toward the upstream side, and
   wherein the angle θ is $0° < θ ≤ 15°$.

4. The welding device according to claim 1,
   wherein the introduction path and the discharge path are oppositely disposed.

* * * * *